United States Patent
Warnick et al.

(10) Patent No.: US 12,380,377 B1
(45) Date of Patent: Aug. 5, 2025

(54) INTELLIGENT GUIDANCE SYSTEM FOR QUEUES

(71) Applicant: UIPCO, LLC, San Antonio, TX (US)

(72) Inventors: Mark Paxman Warnick, San Antonio, TX (US); Elena Marie Carrasco, Converse, TX (US); Celena Dortch, San Antonio, TX (US); Justin Dax Haslam, San Antonio, TX (US); David Jason Anderson James, San Antonio, TX (US); Quian Antony Jones, San Antonio, TX (US); Rosa Maria Smith, San Antonio, TX (US); Katrina Marie Zell, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 177 days.

(21) Appl. No.: 17/717,303

(22) Filed: Apr. 11, 2022

Related U.S. Application Data

(60) Provisional application No. 63/175,619, filed on Apr. 16, 2021.

(51) Int. Cl.
   *G06Q 10/0631* (2023.01)
(52) U.S. Cl.
   CPC .............. *G06Q 10/06311* (2013.01)
(58) Field of Classification Search
   None
   See application file for complete search history.

(56) References Cited

U.S. PATENT DOCUMENTS

| | | | |
|---|---|---|---|
| 2003/0010822 A1* | 1/2003 | Davies | G06Q 10/047 |
| | | | 235/385 |
| 2016/0055429 A1* | 2/2016 | Schwartz | G06Q 10/02 |
| 2016/0180412 A1* | 6/2016 | DuLeone | G06Q 30/0281 |
| | | | 705/346 |
| 2017/0132542 A1* | 5/2017 | Bostick | G06Q 50/01 |
| 2017/0351982 A1* | 12/2017 | Tineo | G06Q 10/0631 |
| 2020/0226523 A1* | 7/2020 | Xu | G06V 40/103 |
| 2021/0279645 A1* | 9/2021 | Morrow | G06Q 10/02 |
| 2022/0043672 A1* | 2/2022 | Chhabra | G06F 9/4881 |

FOREIGN PATENT DOCUMENTS

WO   WO-2017186271 A1  * 11/2017

OTHER PUBLICATIONS

Fuerst, et al. "CoasterQueue—Tracking Wait Times with Mobile Phones." International Journal of Next-Generation Computing, vol. 6, No. 1, Mar. 2015. (Year: 2015).*

* cited by examiner

*Primary Examiner* — Susanna M. Diaz
(74) *Attorney, Agent, or Firm* — Plumsea Law Group, LLC

(57) ABSTRACT

A system and method for intelligent queueing and guidance is disclosed. The system and method can be used to determine when a user should queue and to provide navigation to a queueing location. The system can include a queueing detection and monitoring module, a queue prediction module, a navigation module, and an optimal timing module. The system can be implemented with mobile devices including smart phones, smart watches, and/or other wearable devices.

11 Claims, 9 Drawing Sheets

INTELLIGENT GUIDANCE SYSTEM FOR QUEUES

CROSS-REFERENCE TO RELATED APPLICATIONS

This application claims the benefit of Provisional Patent Application No. 63/175,619 filed Apr. 16, 2021, and titled "Intelligent Guidance Systems for Queues," which is incorporated by reference herein in its entirety.

TECHNICAL FIELD

The present disclosure generally relates to computing systems, and in particular to computing systems and methods for providing guidance to users about entering a queue of people.

BACKGROUND

There are many situations where a person may need to get in line behind other customers/patrons/users in order to use a service. In some situations, such as at the department of motor vehicles, customers may be given a number upon entering that decides the order in which they will be serviced. In many other situations, however, there are no existing systems to facilitate lining up (or "queueing"). In such situations, customers may spend a lot of time in line, which may be an inefficient use of their time, especially if the size of the line varies significantly over time.

There is a need in the art for a system and method that addresses the shortcomings discussed above.

SUMMARY

In one aspect, a method of informing a user when to queue at a queueing location using a mobile device includes using the mobile device, location information from a plurality of mobile devices. The method also includes detecting, using the location information from the plurality of mobile devices, a queue of people disposed adjacent to the queueing location. The method also includes monitoring the number of people in the queue over time, and alerting the user, using the mobile device, to start queueing.

In another aspect, a method of reducing the amount of time a user spends in a queue includes receiving, using a mobile device, a request from the user to queue at a queueing location. The method also includes retrieving, using the mobile device, location information from a plurality of mobile devices and detecting, using the location information from the plurality of mobile devices, a queue of people adjacent to the queueing location. The method further includes determining the number of people in the queue, retrieving a threshold queue size for the queueing location, comparing the number of people in the queue to the threshold queue size, and alerting the user, using the mobile device, to move to the queueing location when the current number of people in the queue is less than the threshold queue size.

In another aspect, a method of reducing the amount of time a user spends in a queue includes receiving, using a mobile device, a request from the user to queue at a queueing location. The method also includes retrieving, using the mobile device, location information from a plurality of mobile devices. The method further includes detecting, using the location information from the plurality of mobile devices, a queue of people adjacent to the queueing location. The method also includes monitoring the queue over time. The method further includes predicting, based on monitoring the queue over time, an optimal time to queue. The method also includes retrieving, using the mobile device, a current location for the user. The method also includes determining an arrival time at the queueing location based on the current location for the user, comparing the arrival time with the optimal time to queue, and alerting the user to move to the queueing location when the arrival time is earlier than the optimal time to queue.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for guiding a user to get in line (or "queue") at an optimal time that minimizes the amount of time spent standing in line. Specifically, the embodiments provide an intelligent queueing system that can identify queues in the vicinity of a user, monitor the state of the queues over time (including the number of people in the queue), predict optimal times for the user to start queueing, and provide navigation information to the queueing location when the user has moved away from the queue. This reduces the amount of time users must spend in lines and therefore increases the time they can spend on other activities.

Figure 1:
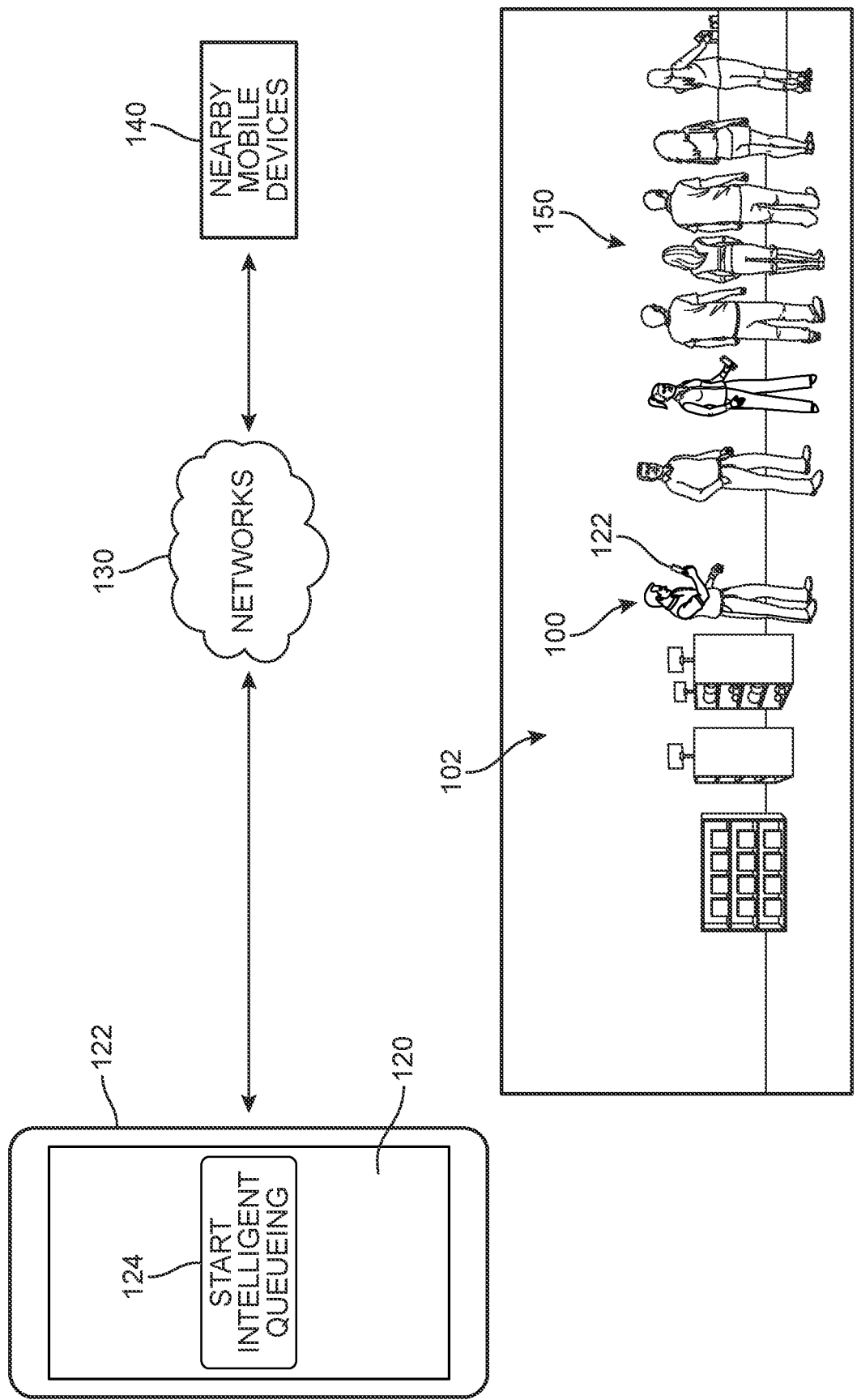
FIG. 1 is a schematic view of a user implementing an intelligent queueing system, according to an embodiment.

FIG. 1 is a schematic view of a scenario where a user 100 may choose to initiate an intelligent queueing system in order to minimize the time spent waiting in line. In this scenario the user is in a region 102 of a store where a long line (or queue) has developed at the cash register. Specifically, queue 150 comprises seven customers. Here, user 100 can initiate an intelligent queueing system by opening an application 120 on their mobile device 122 and selecting button 124 ("Start Intelligent Queueing").

As discussed in further detail below, upon activation, an intelligent queueing system running on mobile device 122 can communicate with other nearby mobile devices 140 (such as phones and wearables) associated with customers in the store via one or more networks 130. The system can detect the presence of a queue in the vicinity of user 100 and monitor how the queue changes over time.

Any suitable network could be used to communicate between a user's device (for example device 122) and nearby mobile devices (such as mobile devices 140). Exemplary networks can include, but are not limited to, local area networks (LANs), wide area networks (WANs), personal area networks (PANs), as well as any combination of these networks. Further examples include Wi-Fi networks and cellular networks. In some cases, communication between devices may be restricted to communication over local area networks and/or personal area networks, to ensure that users are in relatively close geographic proximity.

Figure 2:
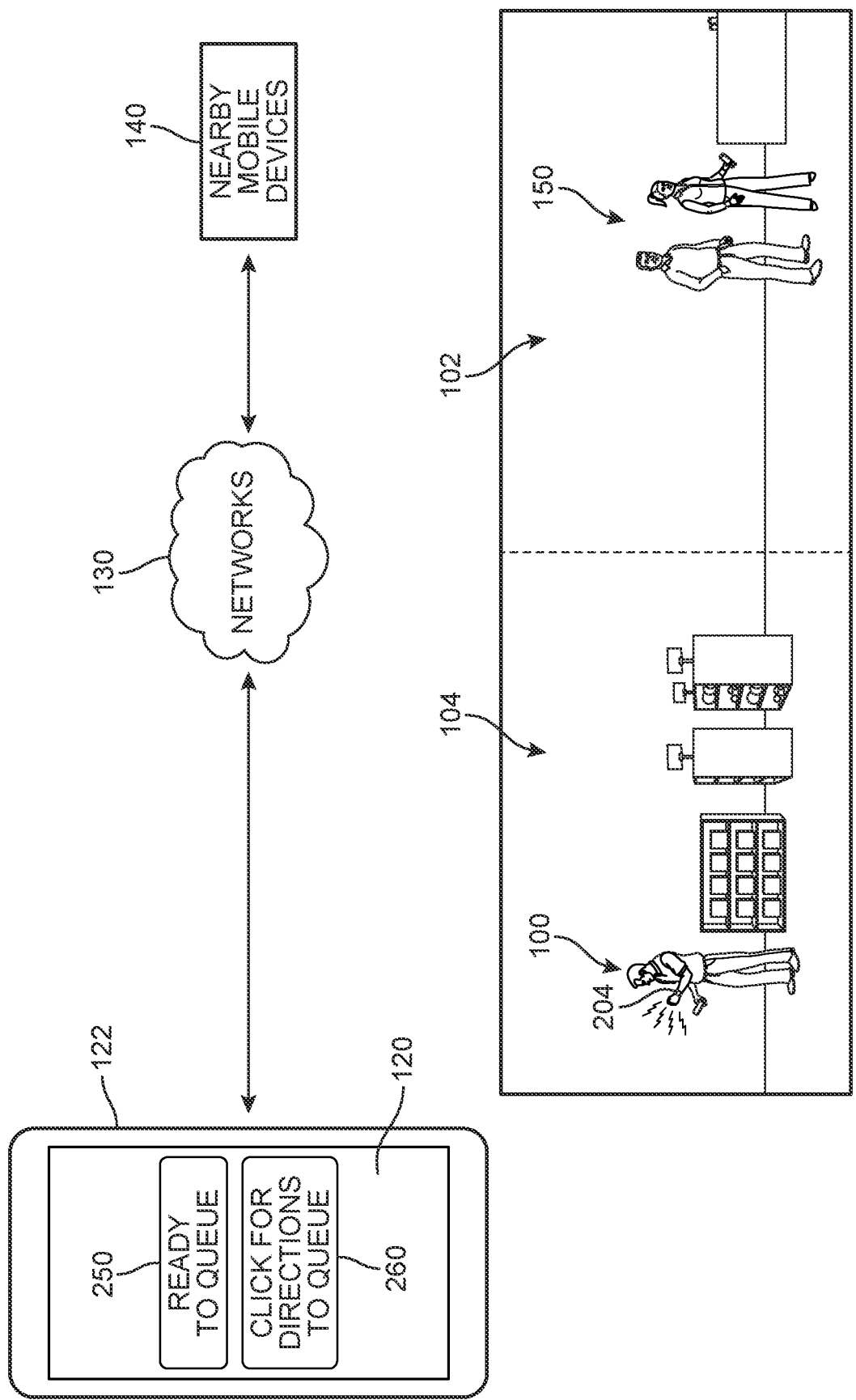
FIG. 2 is a schematic view of a user receiving messages from an intelligent queueing system, according to an embodiment.

In FIG. 2, user 100 has continued shopping and is located at a different region 104 of the store from queue 150. User 100 is then alerted, via mobile device 122, that they can now start queueing. In some cases, a push notification 250 ("Ready to Queue") may be delivered to a user's mobile phone 122. In the exemplary embodiment, user 100 may also be alerted by a notification on smart watch 204. The notifications can be accompanied by audible noises and/or haptic feedback. In some embodiments, this notification to queue can also be accompanied by navigation instructions from the user's current location to the location of queue 150 (also referred to as a "queueing location"). In the present embodiment, the system provides an option 260 ("Click for Directions to Queue") to receive navigation instructions to the queueing location.

In different embodiments, an intelligent queueing system can be configured to operate on various different kinds of mobile devices, including, but not limited to: smart phones, tablet computing devices, smart watches, and other wearables. In an exemplary embodiment, intelligent queueing system may operate on a user's smart phone. However, it may be appreciated that in other embodiments, other devices may be used and those devices could include similar components to those shown in FIG. 3 and described below.

Figure 3:
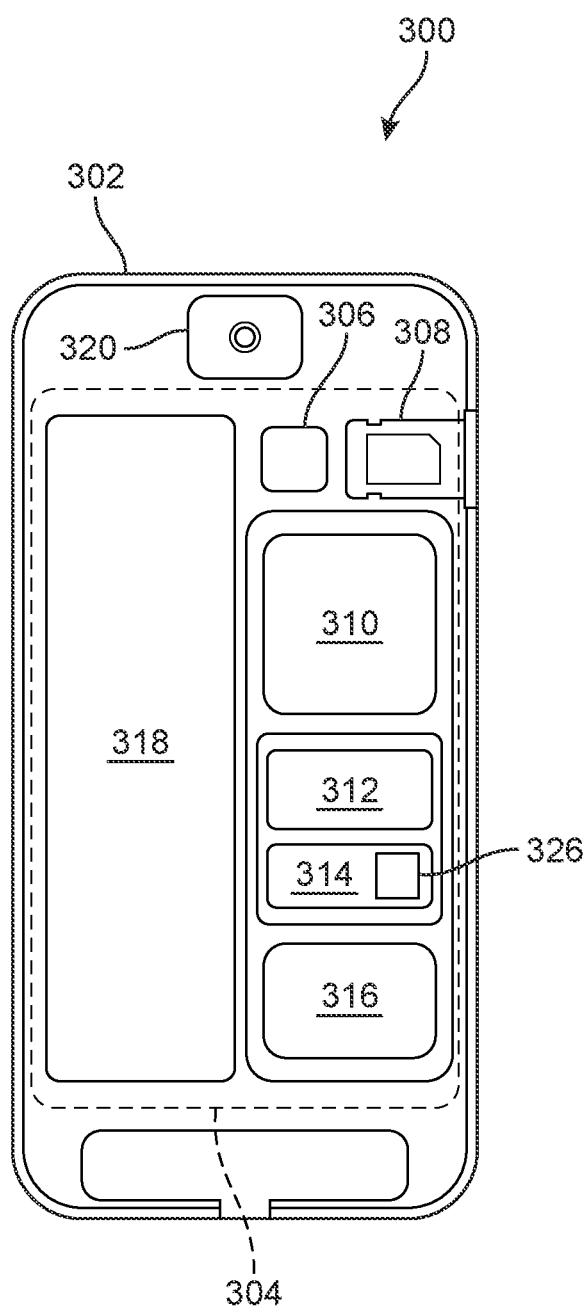
FIG. 3 is a schematic view of a mobile device, according to an embodiment.

FIG. 3 is a schematic diagram 300 of common components of a smart phone 302 that may be used to implement the embodiments disclosed herein. Functionally similar components are present in the other types of computing devices listed above. In this example, smart phone 302 includes a display 304, which displays applications and data stored on smart phone 302. Smart phone 302 additionally includes a GPS component 306. Smart phone 302 includes a subscriber identity module (SIM) 308 with which smart phone 302 registers on cellular/data networks. In some embodiments, SIM 308 also serves as an identifying means with which to associate smart phone 302 with a particular user who has an account on a remote server.

Smart phone 302 includes a processing unit 310 which acts as a control module for the components of mobile device 302, including display 304 and camera 320. Smart phone 302 includes a connection module 312. Connection module 312 is associated with wired connections to smart phone 302, for example, for charging smart phone 302 or for making a wired connection between smart phone 302 and another device.

Smart phone 302 includes a memory 314. Memory 314 may comprise a non-transitory computer readable medium. Instructions stored within memory 314 may be executed by processing unit 310. Memory 314 stores a variety of data and applications, including pre-loaded applications and data that would be common to all users of such a device and applications and data that have been stored in the course of regular use of smart phone 302. In this embodiment, memory 314 also includes a cache 326.

Smart phone 302 includes communications module 316 which controls communications with the institution server and/or with a cloud server. Communications module 316 executes wireless communications between smart phone 302 and other devices, servers, and databases. In particular, communications module 316 can facilitate communication via Wi-Fi, Bluetooth, near field communication (NFC) technologies, cellular communication, and other suitable forms of communication over local area networks, wide area networks and/or personal area networks.

Smart phone 302 includes a battery 318 which provides power to the various components of smart phone 302. Although not visible in the schematic view of FIG. 3, smart phone 302 may also include speakers for generating audible alerts, as well as one or more components for generating haptic feedback.

An intelligent queueing system may be loaded into memory 314 of smart phone 302, for example, in the form of a mobile application running on a suitable mobile operating system. Processing unit 310 may execute instructions pertaining to the intelligent queueing system for various purposes including, but not limited to: identifying and monitoring queues, predicting optimal queueing times, generating notifications, and processing navigation instructions when necessary. Communication with other mobile devices in the vicinity of smart phone 302 may be facilitated by communications module 316.

In some embodiments, smart phone 302 may provide navigation instructions (or directions) to a user. The directions may provide information that helps a user move from their current location to a queueing location in an optimal way. To facilitate this, the smart phone 302 may include one or more applications stored in memory 314 that can determine directions, including directions for indoor spaces (such as stores), using input from GPS component 306.

Figure 4:
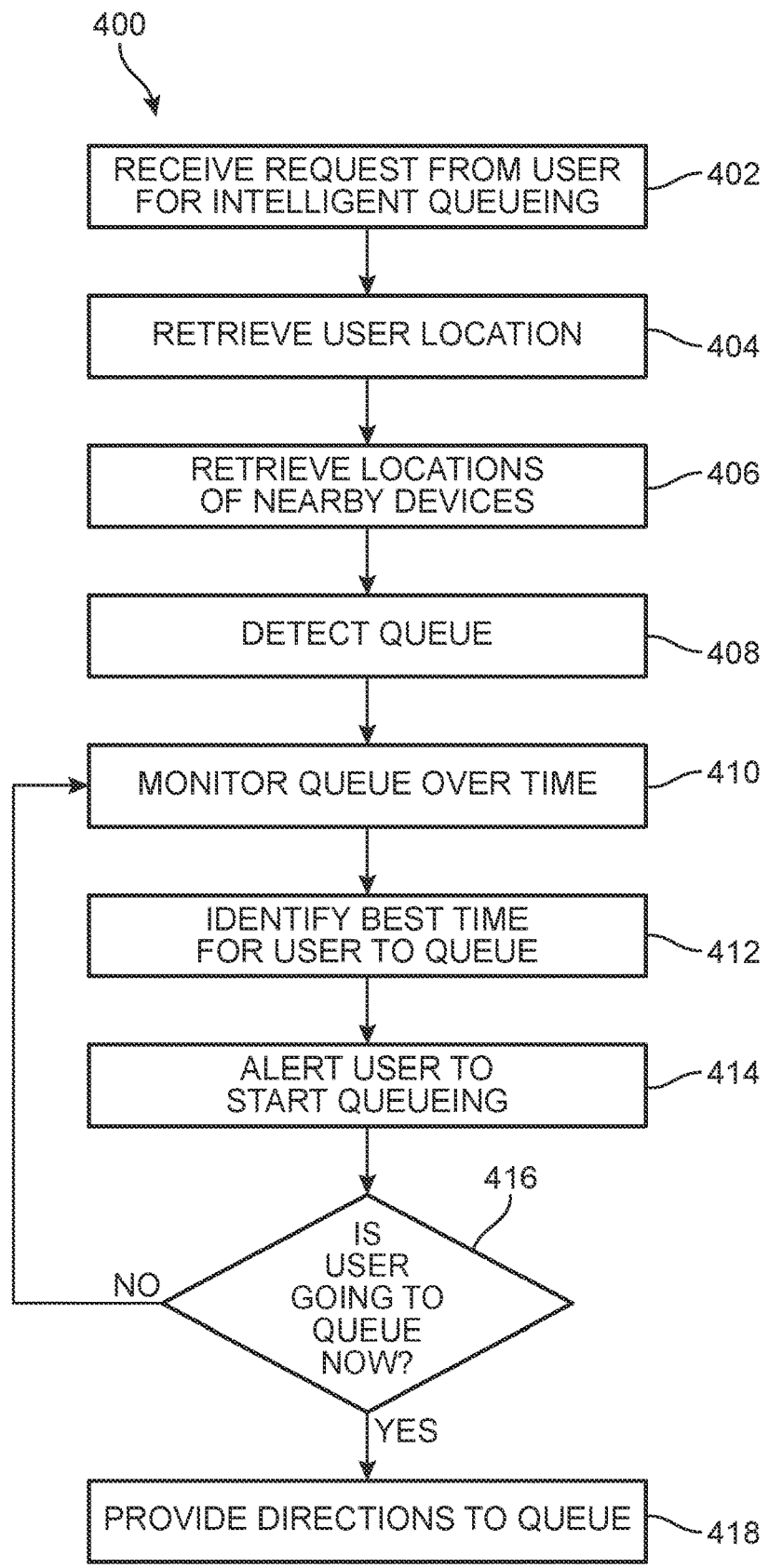
FIG. 4 is a schematic view of a process for an intelligent queueing system, according to an embodiment.

FIG. 4 is a schematic view of a general process 400 for intelligent queueing. Starting in step 402, an intelligent queueing system may receive a request from a user to start queueing. In some cases, this request may be initiated by the user via a mobile application. It may be appreciated that the request could be made by the user opening an application and touching a button (as shown in FIG. 1), or by using an audible request that could be mediated by a smart assistant running on the mobile device.

Next, in step 404, the intelligent queueing system retrieves the current location of the user. In some cases, this information could be retrieved from a GPS system on a mobile device (such as GPS component 306 in FIG. 3). As it may be assumed that the user is near the queue that they want tracked, the current user location may serve as a reference point for searching for nearby devices that may be in a nearby queue. Therefore, the system will next retrieve the locations of any nearby devices, in step 406.

As used herein, users, devices, and/or locations are said to be "nearby", or "in the vicinity of one another" if they are close enough to communicate over a local area network and/or a personal area network. In a small store, all mobile devices carried inside the store may be considered nearby or in the vicinity of one another. However, in larger stores, only devices in particular areas or regions of the store may be considered nearby or in the vicinity to one another. Alternatively, in some cases, two devices may be nearby if they are within a predetermined distance of one another.

The locations of devices could be retrieved via communication between the user's device and nearby devices over one or more kinds of networks. In some cases, location information can be retrieved directly through communication between devices. In other cases, approximate locations may be inferred by, for example, the signal strength of communicated signals. It is contemplated that in at least some embodiments, multiple users in a given location may have a common application that facilitates sharing of various kinds of information over one or more networks, including location information.

Once the locations of various devices have been retrieved, the intelligent queueing system may detect a queue in step 408. Specifically, the system may try to identify a subset of all nearby devices that are clustered together in a manner indicating a possible queue. Alternatively, the system may try to identify a subset of all nearby devices that are located within a predetermined distance, or otherwise clustered around, a queueing location. The queueing location may be identified with the user's location in some cases. For example, when the user activates the intelligent queueing system while standing near to a queue, the system may infer that the location of the queue is in the immediate proximity of the user. Methods for detecting a queue are described in further detail below and shown, for example, in FIGS. 9-10.

Next, in step 410, the intelligent queueing system may monitor the queue over time. This may include, for example, monitoring the number of people in the queue over time. In some cases, the system may also monitor other aspects of the queue, such as the average length of time for one person to be processed in the queue (that is, how long it takes for the line to move). For example, an intelligent queueing system could monitor the number of people in line at a cash register over time and determine the average amount of time it takes for each person to be checked out.

To monitor changes in the queue, the system may continuously receive updates about the locations of various mobile devices in the vicinity of the user. This allows the system to update the status of the queue as some customers leave the queue and others join it. Customers with mobile devices located proximate to the queueing location detected in step 408 are considered to be part of the queue, while customers located a sufficient distance from that location are considered to not be part of the queue.

In step 412, the intelligent queueing system may identify a best time for the user to queue. The best time to queue can be determined according to various different methods. Two possible methods are described below and shown, for example, in FIGS. 5-7.

In step 414, the intelligent queueing system may alert the user that it is a good time to queue. In some cases, this alert may be provided as a recommendation, since it is possible that the user may be busy doing something at that particular moment. If the user decides they cannot start queueing now, the system returns to step 410 and continues monitoring the queue to look for the next best time to queue. If the user is ready to queue, the system can optionally send directions to the queue in step 416. Providing directions may be especially useful when the user is far from the queueing location and there is a narrow window of time for them to get into the queue before the size of the queue increases substantially.

Figure 5:
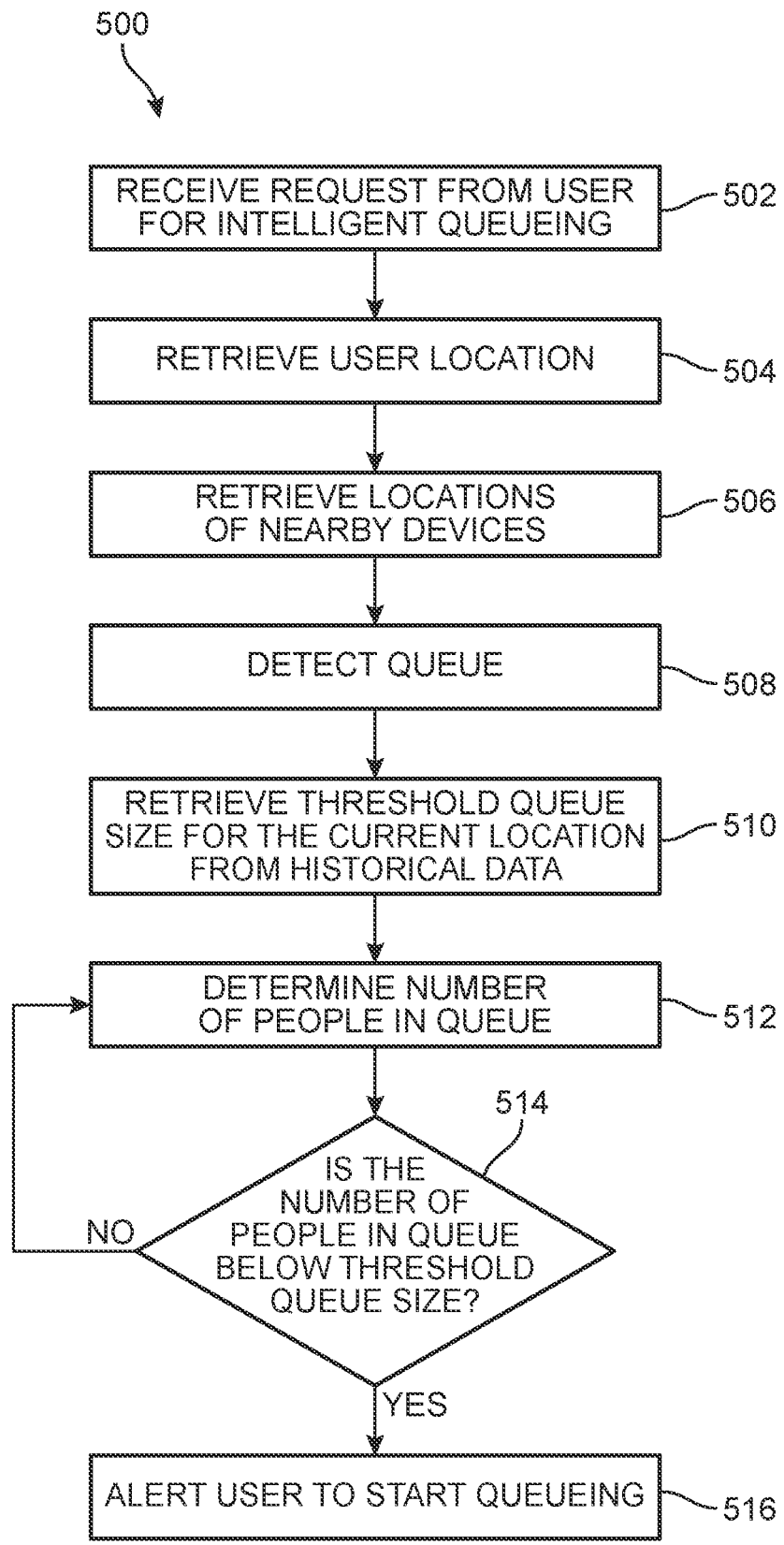
FIG. 5 is a schematic view of a process for an intelligent queueing system, according to another embodiment.

FIG. 5 is a schematic view of one embodiment of a process 500 for an intelligent queueing system that uses a threshold queue size to determine when a user should start queueing. Process 500 may share several steps with process 400 described above. Namely, step 502, step 504, step 506 and step 508 comprise receiving a request to use intelligent queueing, retrieving the user location, retrieving the locations of nearby devices, and detecting a queue, respectively.

Next, in step 510, the system retrieves a threshold queue size for the queue, which may be stored in memory. In some embodiments, the system may use historical data collected from the current user and/or other users to determine a reasonable threshold queue size for a particular location. For example, the system may use historical data to calculate a threshold queue size of three customers at a checkout aisle in a particular grocery store. In some cases, the threshold size could be further selected according to the time of day, as the typical size of a queue in the checkout aisle may vary throughout the day.

In step 512, the intelligent queueing system determines the number of people in the queue based on monitoring the state of the queue over time (i.e., by receiving continuous location updates from nearby customers).

Then, in step 514, the intelligent queueing system can compare the number of people currently in the queue with the threshold queue size. If the number of people currently in the queue is below the threshold queue size, the system may alert the user to start queueing in step 516. Alternatively, the system returns to step 512 to detect the number of people in the queue (which may have changed). It may be appreciated that in other cases, the system may alert the user when the number of people in the queue is less than or equal to the threshold queue size, rather than when the number of people is strictly less than the threshold queue size.

As an example, consider a situation in which a user arrives at a queue of six people in line to check out at a grocery store. Upon activating the intelligent queueing system, the system detects and monitors the number of people in the queue according to the processes described above. In this example, the system may retrieve a threshold value of three customers, based on historical data at this particular store for the particular time of day. The customer can then walk around the store and continue shopping until the system detects that the queue is at or below three customers. Then the system sends the user an alert and the user may choose to go get in line. If the average amount of time to check out each customer in the line is approximately five minutes, the queueing system described in this example could save the user fifteen minutes of time waiting in the queue. This time could be spent on additional shopping, or any other activity that the user can perform while at, or in the vicinity of, the store.

In some embodiments, an intelligent queueing system can dynamically determine an optimal time for a user to queue based on real-time predictions of how the queue will change in the future.

Figure 6:
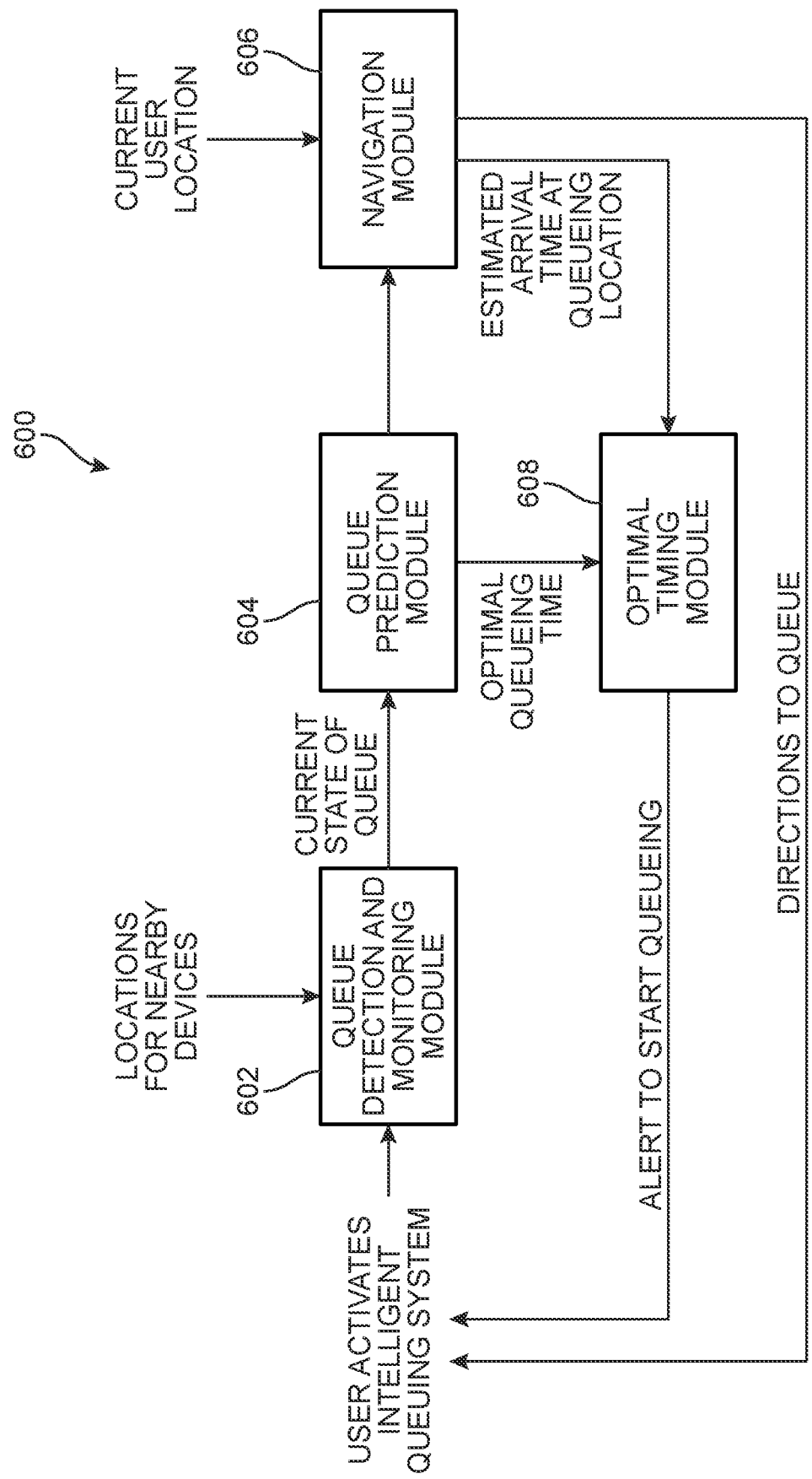
FIG. 6 is a schematic view of an architecture for an intelligent queueing system, according to an embodiment.

FIG. 6 is a schematic view of an architecture for an intelligent queueing system 600 that can dynamically predict an optimal time for a user to queue. In this embodiment, an intelligent queueing system may be further comprised of various modules that work together to determine when a user should be alerted to start queueing. In particular, system 600 may further comprise a queue detection and monitoring module 602, a queue prediction module 604, a navigation module 606, and an optimal timing module 608.

As seen in FIG. 6, a user may activate the intelligent queueing system, which triggers the queue detection and monitoring module 602 to detect a nearby queue. In some cases, queue detection and monitoring module 602 receives locations for nearby devices as input in order to detect a nearby queue. The output of queue detection and monitoring module 602 is information about the current state of the queue. This information could include the number of people in the queue, how quickly the queue is processed (i.e., how quickly people exit the queue after receiving a service), as well as other suitable information. Based on the current state of the queue, as well as stored information about previous states of the queue, the queue prediction module 604 outputs an optimal queueing time. This optimal queueing time corresponds to a future time when the system believes the queue will be at a minimum size, or below a predetermined threshold, and thus minimize the amount of time the user will spend in the queue.

Navigation module 606 uses a continuously updated location for the user to calculate an estimated arrival time at the queueing location. That is, navigation module 606 determines how long it would take for the user to travel (for example, by walking) from their present location to the location of the queue. In situations where the user has walked to a different part of a large store, or to another store across the street, this travel time could be significant and on the order of several minutes or more. This means that the system cannot rely on the assumption that the user can get in line at the exact time when the queue reaches a minimum.

The system uses optimal timing module 608 to constantly compare updated values for the optimal queueing time and the estimated arrival time. The optimal timing module 608 includes logic to determine if it is possible for the user to get to the queueing location by the optimal queueing time. If, for example, the user is too far away, and the optimal queueing time is soon, it may not make sense to have the user move to the queueing location. Rather, it may be better to wait until the user is closer to the queue, or the optimal queueing time is further in the future (to allow the user more time to travel back to the queue). Furthermore, if the arrival time is significantly earlier than the optimal queueing time, the system can simply wait until the arrival time is closer to the optimal queueing time before alerting the user.

If the arrival time and the optimal queueing time match, within a predetermined tolerance, optimal timing module 608 generates a signal to alert the user to start queueing. In some cases, selection of an appropriate tolerance can be made using historical data. As an example, in one embodiment the system may alert the user to start queueing if the estimated arrival time is within 30 seconds of the optimal queueing time. In some cases, the system could simultaneously generate navigation instructions for the user via navigation module 606.

Figure 7:
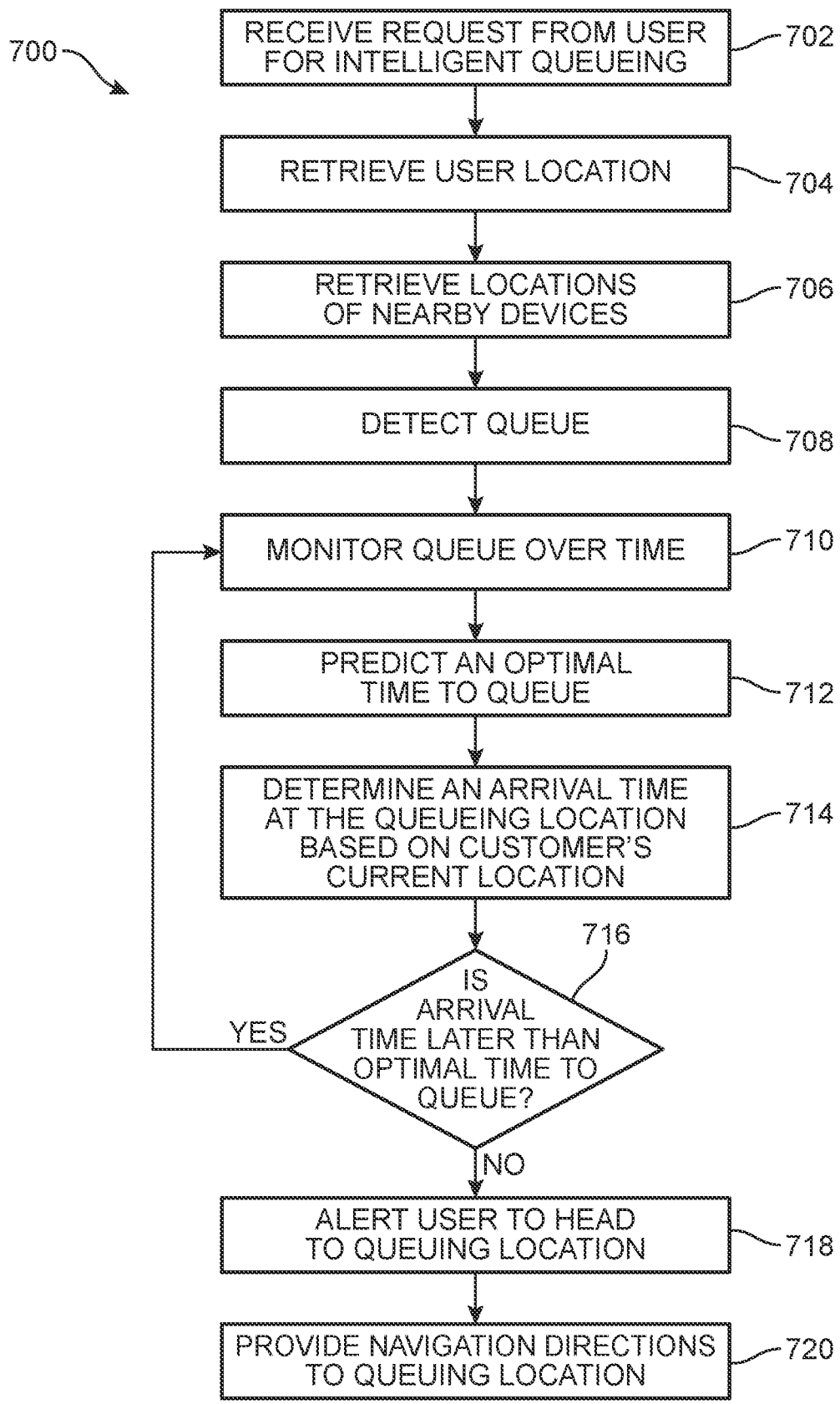
FIG. 7 is a schematic view of a process for an intelligent queueing system, according to another embodiment.

FIG. 7 is a schematic view of one embodiment of a process 700 for an intelligent queueing system that uses the architecture described above and shown in FIG. 6. Process 700 may share several steps with process 400 and process 500 described above. Namely, step 702, step 704, step 706 and step 708 comprise receiving a request to use intelligent queueing, retrieving the user location, retrieving the locations of nearby devices, and detecting a queue, respectively.

After detecting the queue, the intelligent queueing system may continue monitoring the queue over time in step 710. Next, in step 712, the intelligent queueing system predicts an optimal time to queue. As already mentioned, the optimal time to queue can be determined via a queue prediction module (for example, queue prediction module 604 of FIG. 6).

Figure 8:
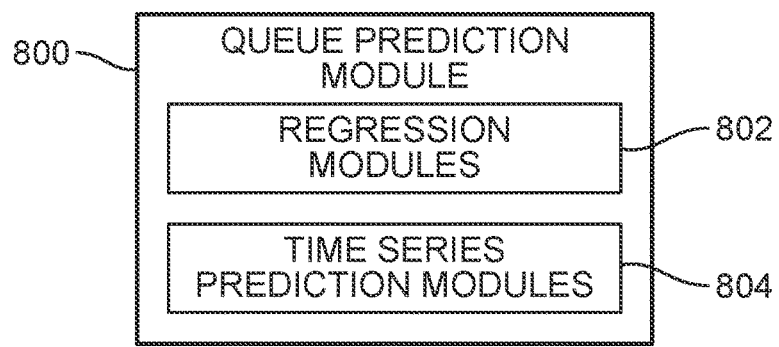
FIG. 8 is a schematic view of a queue prediction module, according to an embodiment.

In different embodiments, the optimal time to queue could be determined according to different methods. FIG. 8 shows an embodiment of a queue prediction module 800 that further includes one or more regression modules 802 as well as one or more time series prediction modules 804.

Figure 9:
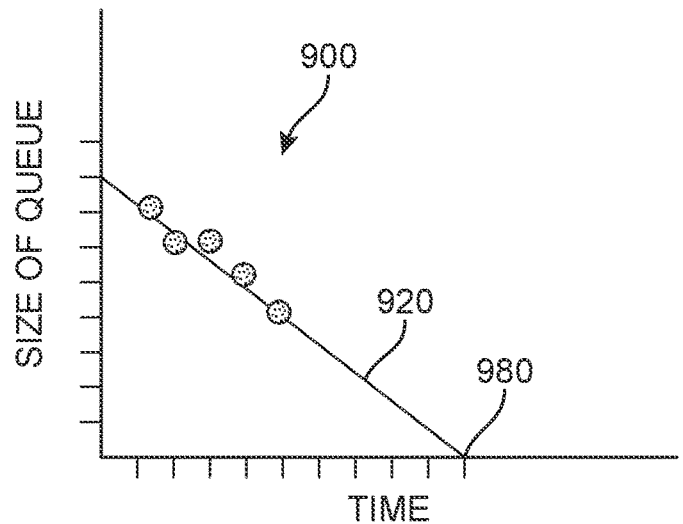
FIG. 9 is a schematic view of an exemplary prediction for the size of a queue over time.

In some cases, a queue prediction module may use linear regression to predict an optimal queueing time. For example, FIG. 9 shows a schematic plot 900 of the size of a queue (the number of people in the queue) as a function of time. In this case, the size of the queue is initially large (7 people), but shrinks over time in a linear manner. This situation may be common for services where people tend get in line at particular times and then the queue tends to dwindle over time without new people lining up right away. In this case, a linear regression 920 is used to predict an optimal time 980 when the queue will be empty.

Figure 10:
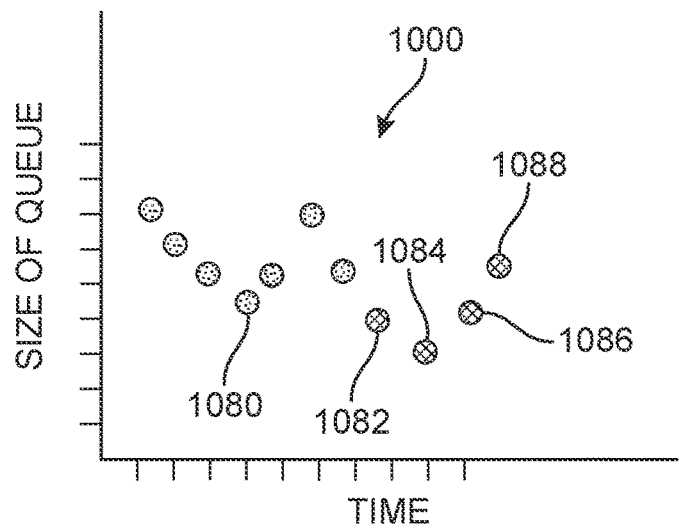
FIG. 10 is a schematic view of another exemplary prediction for the size of a queue over time.

In some cases, a queue may change in a dynamic manner that is not easily predicted using linear regression. In such cases, one or more time series prediction modules 804 could be used to predict a local minimum in the queue size. As used herein the term "local minimum" refers to a minimum within a particular time period. FIG. 10 shows a schematic plot 1000 of the size of a queue as a function of time. In this case, the number of people decreases initially, but then starts increasing at time 1080. Using time series prediction modules 804, the queue prediction module can predict future queue sizes at time 1082, time 1084, time 1086, and time 1088. Based on these predicted queue sizes, a local minimum for the queue size can be identified at time 1084. This is then determined to be the next optimal queueing time for the user. Of course, because of the dynamic nature of the queue, another local minimum could be found at a later time. However, as the uncertainty in queue size may grow for predictions over longer periods of time, the system may tend to choose the next local minimum as the optimal queueing time, rather than local minimums that occur at later times.

Returning to process 700 in FIG. 7, once the system has predicted an optimal time to queue in step 712, the system may proceed to step 714. In step 714, the system can determine an arrival time at the queueing location based on the customer's current location. This step may be performed by a navigation module (such as navigation module 606 in FIG. 6).

In step 716, the system determines if the arrival time is later than the optimal time to queue. This step could be performed by an optimal timing module (such as optimal timing module 608 in FIG. 6). If the arrival time is later than the optimal time to queue (possibly within a predetermined tolerance), the system returns to step 710 to continue monitoring the queue over time. At this point the system may gather additional data points and improve its accuracy for predicting an optimal queueing time. Additionally, as the user moves around both the arrival time may change and optimal queueing time may change.

If the arrival time is not later than the optimal queueing time (possibly within a predetermined tolerance), the system proceeds from step 716 to step 718. In step 716, the system alerts the user to head to the queueing location. In some cases, the system may further provide navigation directions to the queueing location in step 720.

In some cases, the arrival time may be significantly earlier than the optimal time to queue. In that case, the system may wait to alert the user to queue until the arrival time is closer to the time to queue. Alternatively, the system may deliver a message alerting the user to the optimal queueing time so that the user has a sense of how much longer they have until they should get in line.

As an example, consider a situation in which a user arrives at a queue of seven people in line at a mall kiosk. Upon activating the intelligent queueing system, the system detects and monitors the number of people in the queue according to the processes described above. In this example, the system may continuously monitor the state of the queue (including the number of people) and make predictions about an optimal queueing time according to features of the initial data. If the initial data shows a generally linear progression (as in FIG. 9), the system could use linear regression to predict an optimal queueing time. If the initial data is non-linear (as in FIG. 10), the system could use more sophisticated time series prediction modules.

Once an optimal queueing time has been predicted, the system then checks to see if it is possible for the user to arrive at the queueing location around the optimal time to queue. If so, the system can alert the user to head to the queueing location.

Figure 11:
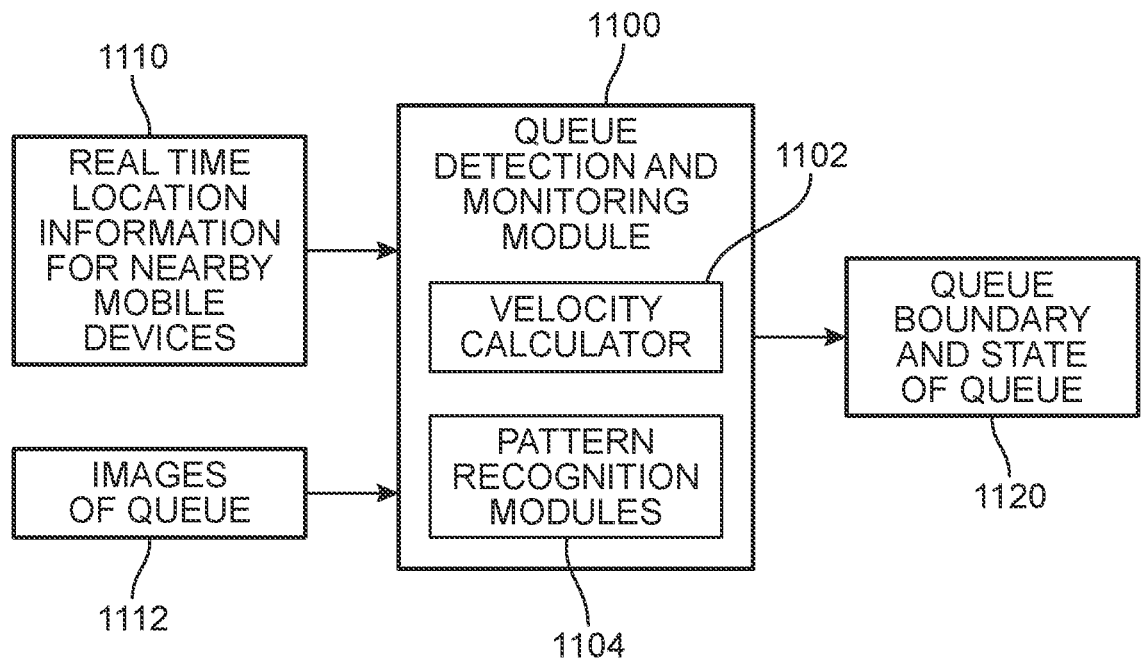
FIG. 11 is a schematic view of a queue detection and monitoring module, according to an embodiment.

FIG. 11 is a schematic view of a queue detection and monitoring module 1100, which may include further sub-modules, according to an embodiment. As seen in FIG. 11, module 1100 may further include a velocity calculator 1102 and one or more pattern recognition modules 1104. Module 1100 may further receive one or more inputs. In some cases, module 1100 receives real time location information for nearby mobile devices (input 1110). In some cases, module 1100 may also receive images of a queue (input 1112).

Using real-time location information allows module 1100 to determine the approximate locations of people with mobile devices in a given area (such as within a store, or within a particular area in a store). Additionally, velocity calculator 1102 may be used to determine which people may be moving based on changes in real time locations. One or more pattern recognition modules 1104 can then be used, in conjunction with location and velocity information, to detect a nearby queue and identify the mobile devices identified with that queue.

Figure 12:
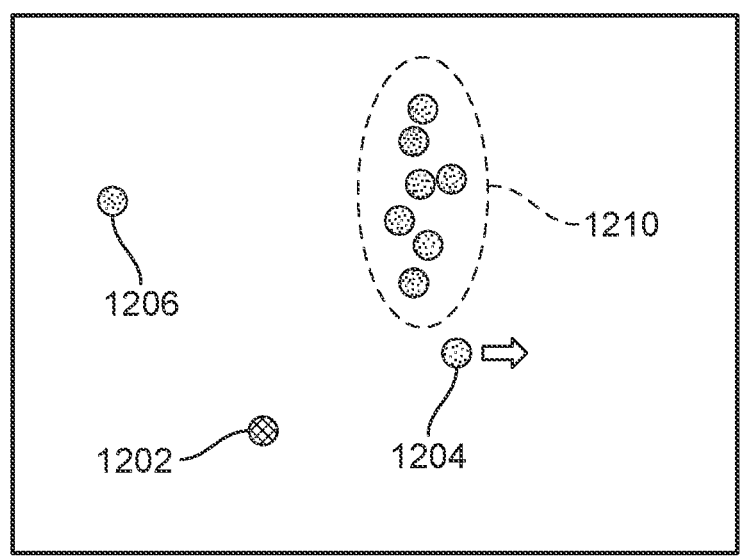
FIG. 12 is a schematic view of a visualization of a queue detected by clustering, according to an embodiment.

As an example, to clarify the operation of queue prediction module 1100, FIG. 12 shows a schematic top-down view of a map of the locations of devices that are nearby to a user location 1202. Here, the system identifies most of the devices as having a substantially constant position. Using a clustering model, the system identifies a cluster of devices located within a queueing region defined by a queueing boundary 1210. This boundary encloses seven device locations that presumably correspond to people waiting in a queue.

The system has identified that the device associated with location 1204 is traveling away from the user identified location 1202 (and from the queue defined by queueing boundary 1210) with a substantial velocity, suggesting that they are not in a queue. Additionally, the device location 1206 is deemed to be too far from the cluster to be part of the queue.

Once a queue has been identified, the system may continually track the locations of devices inside and outside of the queueing boundary and monitor changes in the queue over time. It may be appreciated that as the locations of the devices change over time, the system may update the queueing boundary to determine which devices are still associated with the queue.

The output 1150 of module 1100 is real-time information about the queue, which may include both a queue boundary as well as other information about the queue (i.e., the queue state). The queue state information can include the number of devices in the queue (a proxy for the number of people in the queue), as well as information about how fast the queue is moving along.

The embodiments can use any suitable pattern recognition systems for identifying queues and tracking the evolution of the queues over time. Exemplary pattern recognition systems may include, but are not limited to, systems using clustering techniques, neural networks, decision trees, or other suitable systems.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of comparing continuous real time location data from a set of mobile computing devices in order to inform a user of when to queue at a queueing location, comprising:

generating primary continuous real time location information with a GPS component in a primary mobile computing device, the primary continuous real time location information being descriptive of a real time physical location of the primary mobile computing device that is associated with a user;

retrieving, with the primary mobile computing device, secondary continuous real time location information from a plurality of secondary mobile computing devices;

the secondary continuous real time location information having been generated in real time by a GPS component in each of the respective secondary mobile computing devices, and is descriptive of real time physical locations of each of the secondary mobile computing devices;

receiving a request input from the user to start queueing, the request being inputted into the primary mobile computing device by the user by engaging in at least one of touching a button on the primary mobile computing device and speaking an audible request that is received by the primary mobile computing device;

detecting, by comparing with the primary mobile computing device the secondary continuous real time location information from the plurality of secondary mobile computing devices with the primary continuous real time location information and identifying a subset of all secondary mobile computing devices that are clustered together in a vicinity of the user, a queue of people disposed adjacent to a queueing location in response to receiving the request input from the user to start queuing;

monitoring, in response to detecting the queue of people, the number of people in the queue over time by receiving the secondary continuous real time location data from the subset of secondary mobile computing devices, comparing the secondary continuous real time location data with the queueing location using a clustering model to identify the subset of secondary mobile computing devices located within a queueing region defined by a queueing boundary, and determining that fewer secondary mobile computing devices are located at the queueing location;

alerting the user in response to monitoring the number of people in the queue over time, using the primary mobile computing device, to start queueing by generating an optimal queueing time for the user to start queueing that minimizes a time spent by the user in the queue and sending an alert to the primary mobile computing device when the optimal queueing time and an arrival time at the queueing location match;

the alert being in the form of an audible alert generated by speakers in the primary mobile computing device, or in the form of haptic feedback generated by a haptic component in the primary mobile computing device;

the optimal queueing time being generated based on a number of people in the queue and how quickly the queue is being processed, based on the secondary continuous real time location information generated by each of the GPS components in the respective secondary mobile computing devices using one or more time series prediction modules to predict a local minimum in the queue size within a particular time period;

the arrival time at the queueing location being generated by comparing the primary continuous real time location information generated by the GPS component in the primary mobile computing device with the queueing location;

receiving a confirmation input from the user in response to alerting the user, the confirmation input being inputted into the primary mobile computing device by the user; and providing navigation directions to the user on a display of the primary mobile computing device in response to receiving the confirmation input from the user indicating that the user will start queueing at the time of receiving the alert, the navigation directions having been generated by the primary mobile computing device using input from the GPS component in the primary mobile computing device.

2. The method according to claim 1, wherein the method further includes retrieving a threshold queue size and retrieving a current number of people in the queue.

3. The method according to claim 2, wherein the method further includes comparing the current number of people in the queue with the threshold queue size and alerting the user to start queueing when the current number of people in the queue is less than the threshold queue size.

4. The method according to claim 2, wherein the method further includes comparing the current number of people in the queue with the threshold queue size and alerting the user to start queueing when the current number of people in the queue is less than or equal to the threshold queue size.

5. The method according to claim 1, wherein the
step of alerting the user to start queueing when the optimal queueing time and an arrival time at the queueing location match occurs when the optimal queueing time and an arrival time at the queueing location match each other within a predetermined tolerance, the predetermined tolerance being selected based on historical data.

6. A method of comparing continuous real time location data from a set of mobile computing devices in order to reducing the amount of time a user spends in a queue, comprising:

generating primary continuous real time location information with a GPS component in a primary mobile computing device, the primary continuous real time location information being descriptive of a real time physical location of the primary mobile computing device that is associated with a user;

receiving, with the primary mobile device, a request input from the user to start queueing at a queueing location, the request being inputted into the primary mobile computing device by the user by engaging in at least one of touching a button on the primary mobile computing device and speaking an audible request that is received by the primary mobile computing device;

retrieving, with the primary mobile device, secondary continuous real time location information from a plurality of secondary mobile computing devices;

the secondary continuous real time location information having been generated in real time by a GPS component in each of the respective secondary mobile computing devices, and is descriptive of real time physical locations of each of the secondary mobile computing devices;

detecting, by comparing with the primary mobile computing device the secondary continuous real time location information from the plurality of secondary mobile computing devices with the primary continuous real time location information and identifying a subset of all secondary mobile computing devices that are clustered together in a vicinity of the user, a queue of people adjacent to the queueing location in response to receiving the request input from the user to start queueing;

determining, in response to detecting the queue of people, the number of people in the queue;

retrieving a threshold queue size for the queueing location;

comparing the number of people in the queue to the threshold queue size by comparing the secondary continuous real time location data with the queueing location using a clustering model to identify the subset of secondary mobile computing devices located within a queueing region defined by a queueing boundary, and determining that fewer secondary mobile computing devices are located at the queueing location; and alerting the user in response to comparing the number of people in the queue with the threshold queue size and determining that fewer secondary mobile computing devices are located at the queueing location, using the primary mobile computing device, to move to the queueing location when the current number of people in the queue is less than the threshold queue size queueing by generating an optimal queueing time for the user to start queueing that minimizes a time spent by the user in the queue and sending an alert to the primary mobile computing device when the optimal queueing time and an arrival time at the queueing location match;

the alert being in the form of an audible alert generated by speakers in the primary mobile computing device, or in the form of haptic feedback generated by a haptic component in the primary mobile computing device;

the optimal queueing time being generated based on a number of people in the queue and how quickly the queue is being processed, based on the secondary continuous real time location information generated by each of the GPS components in the respective secondary mobile computing devices using one or more time series prediction modules to predict a local minimum in the queue size within a particular time period;

the arrival time at the queueing location being generated by comparing the primary continuous real time location information generated by the GPS component in the primary mobile computing device with the queueing location;

receiving a confirmation input from the user in response to alerting the user, the confirmation input being inputted into the primary mobile computing device by the user; and providing navigation directions to the user on a display of the primary mobile computing device in response to receiving the confirmation input from the user indicating that the user will start queueing at the time of receiving the alert, the navigation directions having been generated by the primary mobile computing device using input from the GPS component in the primary mobile computing device.

7. The method according to claim 6, wherein the step of alerting the user to start queueing when the optimal queueing time and an arrival time at the queueing location match occurs when the optimal queueing time and an arrival time at the queueing location match each other within a predetermined tolerance, the predetermined tolerance being selected based on historical data.

8. The method according to claim 6, wherein retrieving the threshold queue size includes retrieving the threshold queue size from historical data comprising two or more queueing locations and corresponding threshold queue sizes.

9. The method according to claim 6, wherein detecting the queue of people further includes using at least one machine learning algorithm.

10. The method according to claim 9, wherein detecting the queue of people further includes using a clustering algorithm.

11. The method according to claim 6, wherein alerting the user includes sending a message to the user through the mobile device.

* * * * *